United States Patent
Huang

(10) Patent No.: US 10,309,370 B2
(45) Date of Patent: Jun. 4, 2019

(54) VANE DEVICE FOR GENERATING OF ELECTRICITY

(71) Applicant: Kuo-Chang Huang, Tainan (TW)

(72) Inventor: Kuo-Chang Huang, Tainan (TW)

( * ) Notice: Subject to any disclaimer, the term of this patent is extended or adjusted under 35 U.S.C. 154(b) by 0 days.

(21) Appl. No.: 15/886,208

(22) Filed: Feb. 1, 2018

(65) Prior Publication Data
US 2018/0223801 A1 Aug. 9, 2018

(30) Foreign Application Priority Data

Feb. 6, 2017 (TW) .............................. 106103810 A

(51) Int. Cl.
*F03D 3/06* (2006.01)
*F03D 3/04* (2006.01)
*F03D 3/00* (2006.01)

(52) U.S. Cl.
CPC ............. *F03D 3/064* (2013.01); *F03D 3/002* (2013.01); *F03D 3/04* (2013.01); *Y02E 10/74* (2013.01)

(58) Field of Classification Search
CPC combination set(s) only.
See application file for complete search history.

(56) References Cited

U.S. PATENT DOCUMENTS

| 4,218,183 A * | 8/1980 | Dall-Winther | F03D 3/067 416/119 |
| 6,081,043 A * | 6/2000 | Robles Akesolo | F03D 3/067 290/44 |
| 2010/0278653 A1 * | 11/2010 | Sassow | F03D 3/061 416/223 R |
| 2011/0142659 A1 * | 6/2011 | Janiuk | F03D 3/061 416/223 R |
| 2013/0108464 A1 * | 5/2013 | McEwen | F03B 3/121 416/244 R |
| 2018/0291869 A1 * | 10/2018 | Sauer, Jr. | F03D 3/005 |

* cited by examiner

*Primary Examiner* — Sean Gugger
(74) *Attorney, Agent, or Firm* — Muncy, Geissler, Olds & Lowe, P.C.

(57) ABSTRACT

A vane device includes vane units, coupling modules around a shaft body, and connection units. Each coupling member has two brackets each of which has an insertion hole. Each connection unit is disposed between the brackets and has a rotary member, and two pin members threadedly inserted into the rotary member and projecting outwardly from the rotary member to extend into the insertion holes. When the rotary member is rotated, the pin members are moved toward each other so that the pin members are released from the insertion holes, or moved away from each other so that the pin members are respectively inserted into the insertion holes and each connection unit detachably connects one of the vane units to one of the coupling modules.

11 Claims, 8 Drawing Sheets

VANE DEVICE FOR GENERATING OF ELECTRICITY

CROSS-REFERENCE TO RELATED APPLICATION

This application claims priority to Taiwanese Patent Application No. 106103810, filed on Feb. 6, 2017

FIELD

The disclosure relates to a vane device, and more particularly to a vane device for generation of electricity.

BACKGROUND

An existing vane device for generation of electricity includes a shaft body and a plurality of angularly spaced-apart vanes disposed around the shaft body. In general, the vanes are secured to the shaft body by a plurality of screws.

SUMMARY

An object of the disclosure is to provide a vane device that is adapted for generation of electricity and that is different from an existing vane device.

According to the disclosure, the vane device is adapted for generation of electricity and includes a rotation unit, a plurality of vane units, and a plurality of connection units.

The rotation unit includes a shaft body, and a plurality of angularly spaced-apart coupling modules disposed around the shaft body.

The vane units are mounted to the coupling modules. Each of the vane units includes a frame and amount seat that is connected to the frame. The mount seat extends along an axial direction of the shaft body and has two axially opposite ends.

Each of connection units detachably connects one of the opposite ends of the mount seat of one of the vane units to one of the coupling modules.

Each of the coupling modules has two parallel brackets that are parallel to a common radial plane that extends axially and radially of the shaft body between the brackets. The brackets project from a periphery of the shaft body along the common radial plane. Each of the brackets has an insertion hole that is aligned with the insertion hole of the other one of the brackets along an alignment line normal to the common radial plane.

Each of the connection units is disposed between the brackets of one of the coupling modules. One of the opposite ends of the mount seat of each of the vane units is disposed between the brackets of one of the coupling modules and between one of the connection units and the periphery of the shaft body.

Each of the connection units has a rotary member aligned with the insertion holes of the brackets, and two pin members threadedly inserted into the rotary member and projecting outwardly from two opposite ends of the rotary member to respectively extend into the insertion holes. The rotary member has two screw threads that are oriented oppositely and that respectively and threadedly engage the pin members.

When the rotary member is rotated, the pin members are moved toward each other so that the pin members are released from the insertion holes, or moved away from each other so that the pin members are respectively inserted into the insertion holes.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
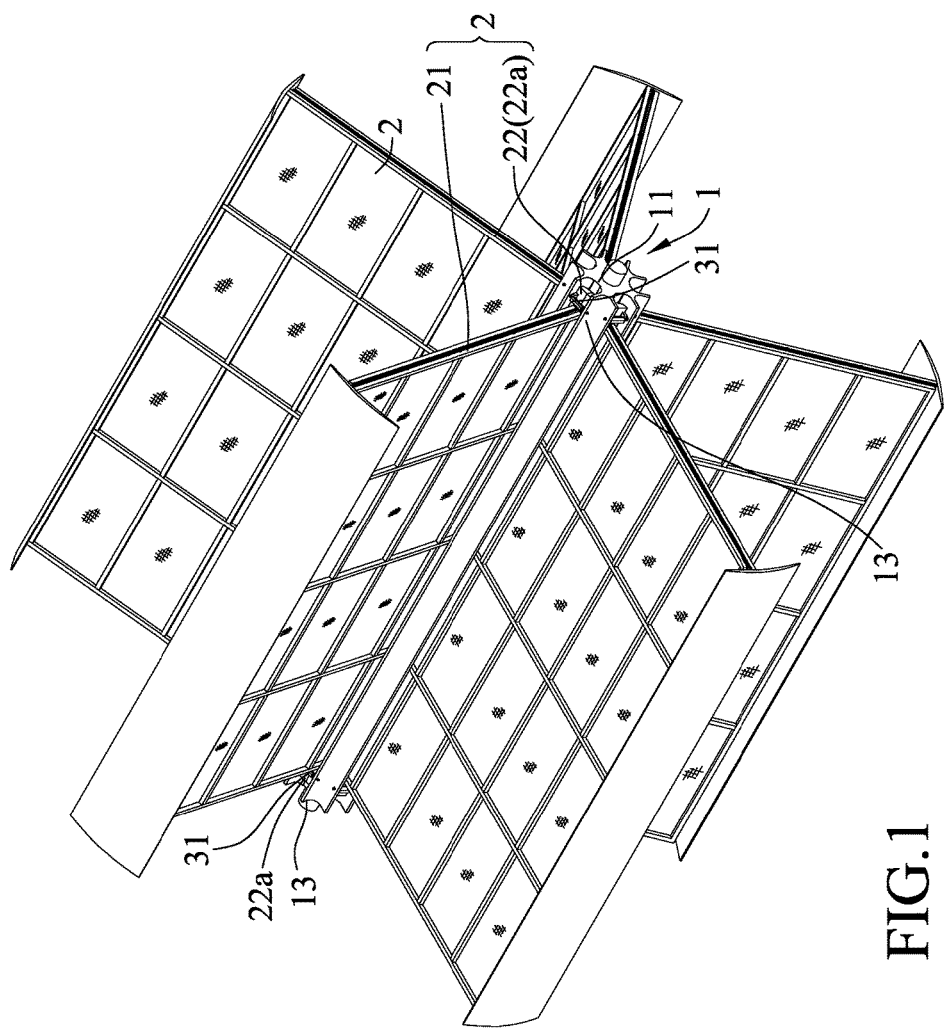
FIG. 1 is a perspective view of a vane device according to an embodiment of the present disclosure.
Figure 2:
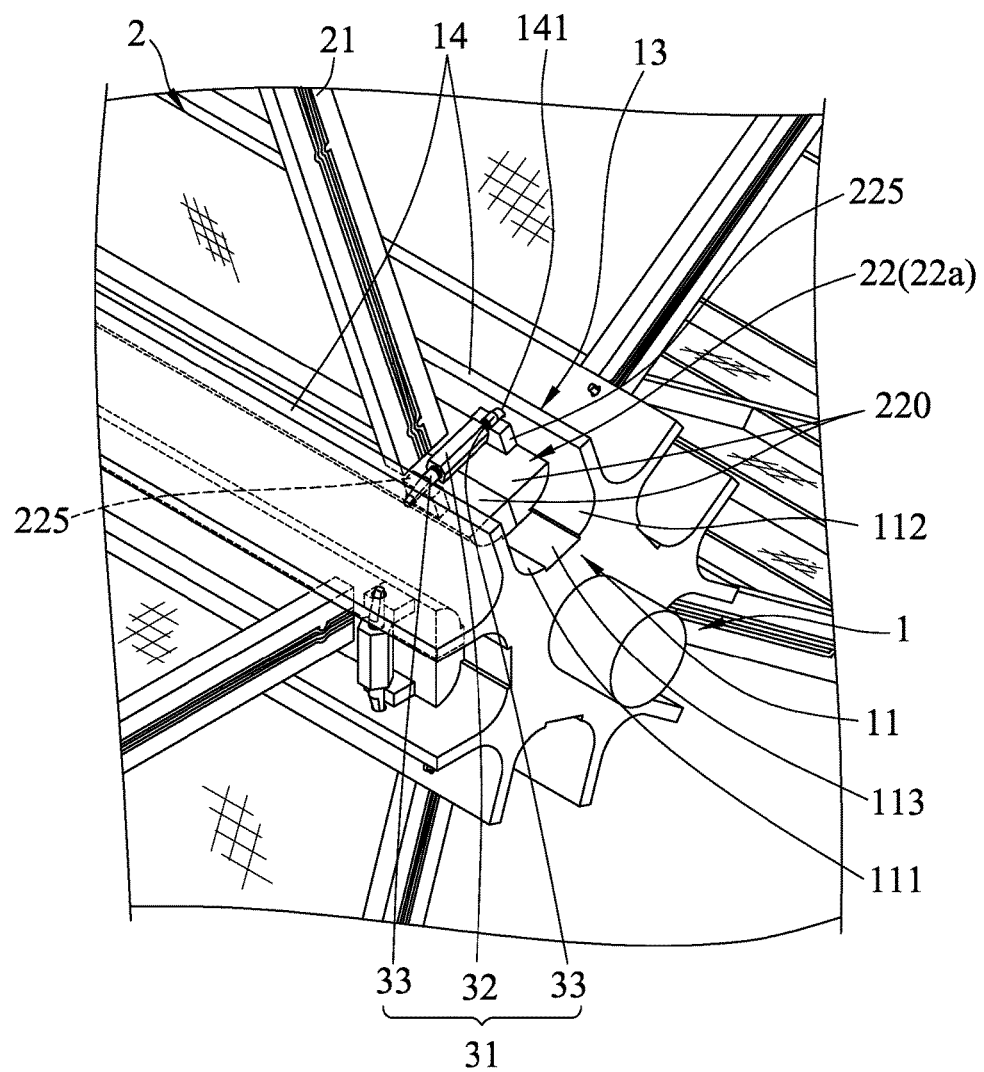
FIG. 2 is an enlarged fragmentary perspective view of the embodiment, illustrating a rotation unit, vane units and connection units.

Referring to FIGS. 1 to 5, a vane device according to an embodiment of the disclosure is shown and includes a rotation unit 1, five vane units 2 and a plurality of connection units 31.

The rotation unit 1 includes a shaft body 11, and a plurality of angularly spaced-apart coupling modules 13 disposed around the shaft body 11 at two axially opposed end portions of the shaft body 11. Each coupling modules 13 has two parallel brackets 14 that are parallel to a common radial plane (L) that extends axially and radially of the shaft body 11 between the brackets 14. The brackets 14 projects from a periphery 111 of the shaft body 11 along the common radial plane (L). The periphery 111 of the shaft body 11 has a plurality of mounting surfaces 112 each of which is formed between the brackets 14 of one of the connection units 13. Each mounting surface 112 is recessed to form an engaging recess 113.

Figure 5:
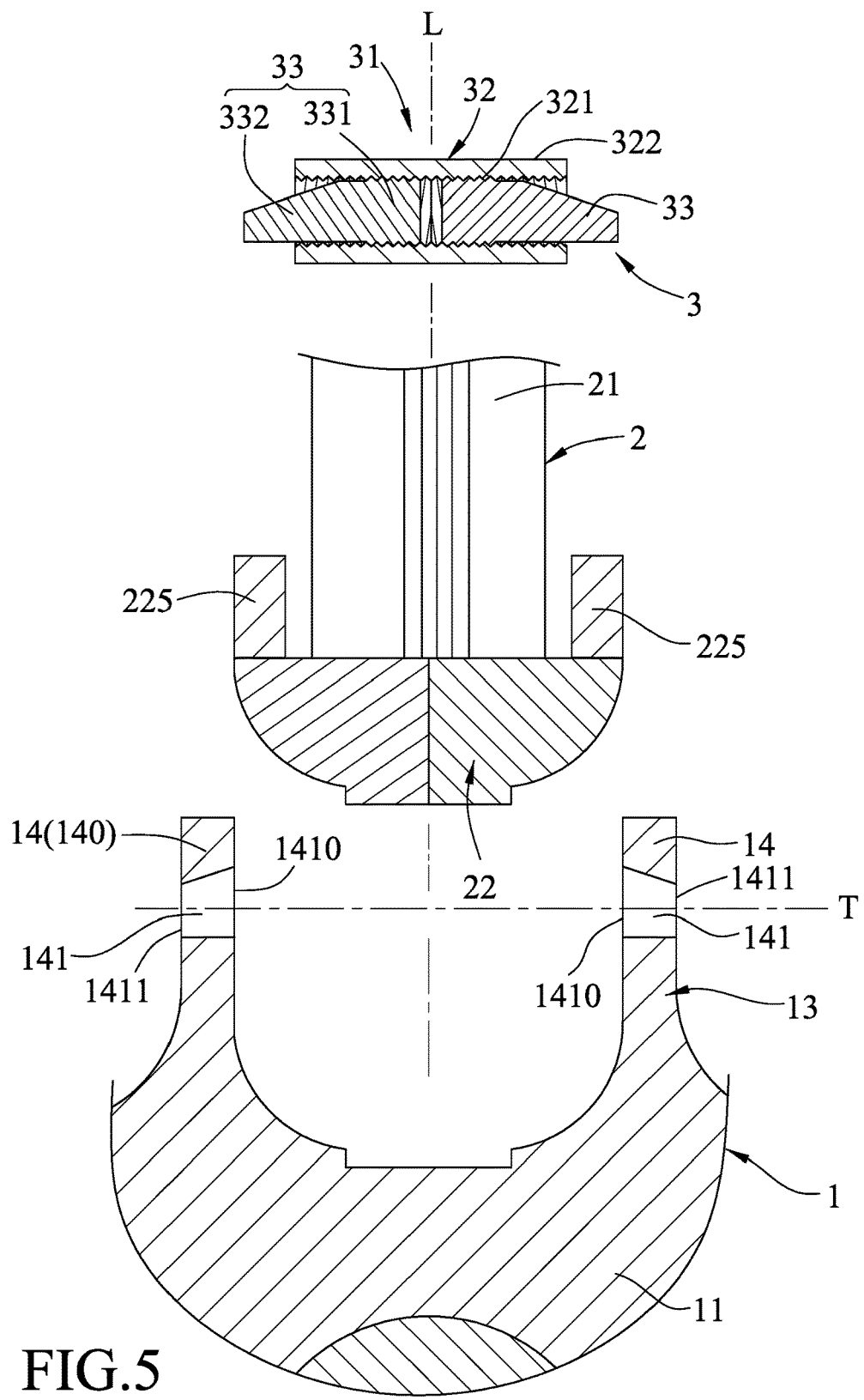
FIG. 5 is a fragmentary exploded view of the embodiment.

Each bracket 14 has a first boundary surface 142 and a second boundary surface 143 facing the first boundary surface 142. The first and second boundary surfaces 142, 143 cooperatively bound an insertion hole 141. The insertion hole 141 of each of the brackets 14 is aligned with the insertion hole 141 of the other one of the brackets 14 along an alignment line (T) normal to the common radial plane (L). As shown in FIG. 5, the insertion hole 141 has a first hole end 1410 proximate to the common radial plane (L), and a second hole end 1411 opposite to the first hole end 1410 and distal from the common radial plane (L). In addition, each bracket 14 has a free end 140 distal from the periphery of the shaft body 11. The second boundary surface 143 is more proximate to the free end 140 than the first boundary surface 142. The second boundary surface 143 is inclined from the alignment line (T) and slanted toward the first boundary surface 142 from the first hole end to 1410 the second hole end 1411. In particular, the second boundary surface 143 is a longitudinally sectioned portion of a truncated conical surface, and the first boundary surface 142 is a flat surface.

In this embodiment, the brackets 14 of two coupling modules 13 disposed at two axially opposed ends of the shaft body 11 are respectively interconnected, thus forming two parallel bars extending axially along the shaft body 11. In practice, according to other embodiments, the brackets 14 of each coupling module 13 at one end of the shaft body 11 may be spaced apart from the brackets 14 of the axially opposite one of the coupling modules 13 at the other end of the shaft body 11.

Figure 3:
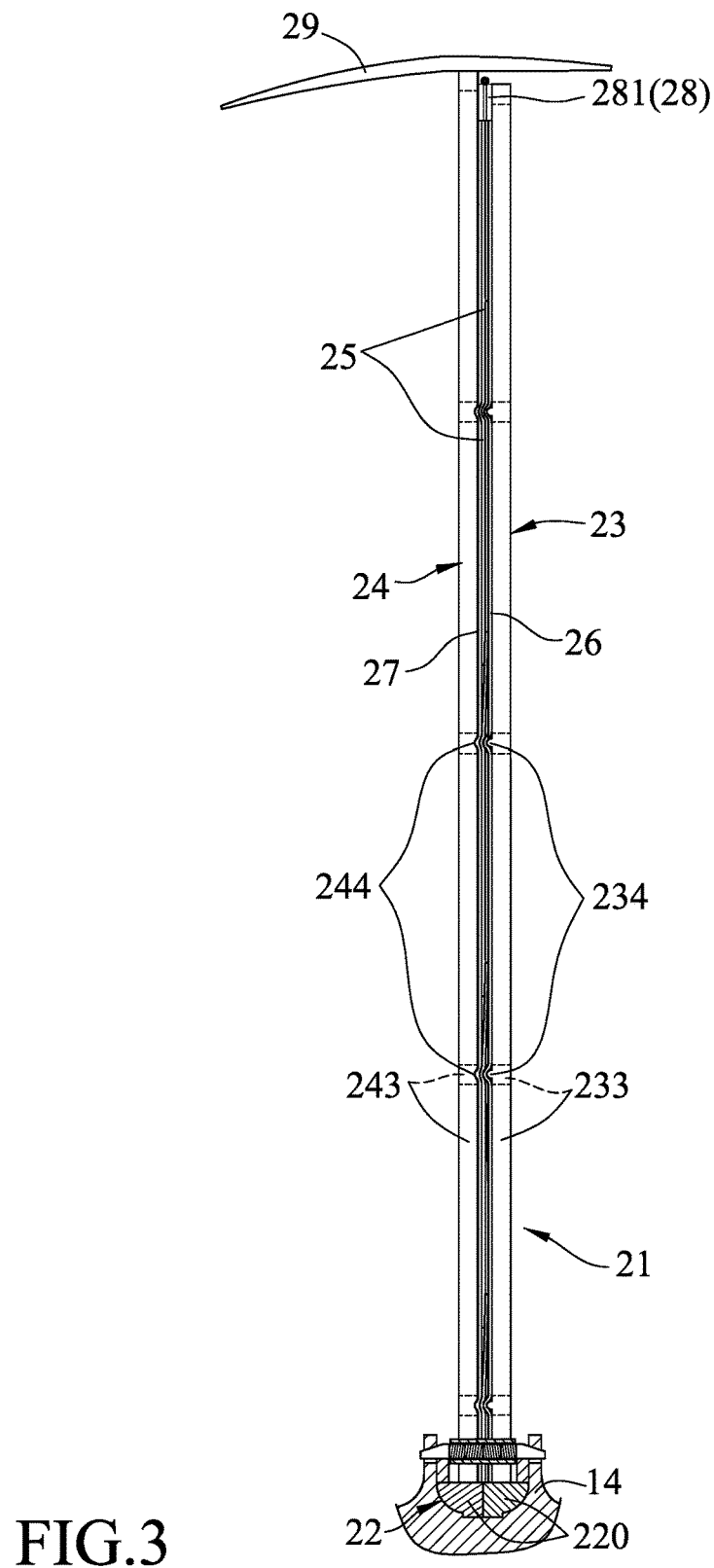
FIG. 3 is a fragmentary sectional view of the embodiment, illustrating one of the vane units.

The vane units 2 are mounted to the coupling modules 13. Each vane unit 12 includes a frame 21 and a mount seat 22 that is connected to the frame 21. The frame 21 is operable to drive rotation of the shaft body 11 when subjected to wind. In this embodiment, the frame 21 has a first frame member 23, a second frame member 24, a plurality of recycled vane sheets 25 clamped between the first and second frame members 23, 24, a first mesh screen 26 disposed between the recycled vane sheets 25 and the first frame member 23, a second mesh screen 27 disposed between the recycled vane sheets 25 and the second frame member 24, a hinge member 28 interconnecting the first and second frame members 23, 24 at one end of the frame 21 distal from the shaft body 11 (only one is shown in FIG. 3), and a flow guide plate 29 connecting the first and second frame members 23, 24 at the one end of the frame 21 distal from the shaft body 11.

The first frame member 23 has a plurality of intersecting spaced-apart first rods 233, and a plurality of studs 234 projecting toward the second frame member 24 from the first rods 223. The second frame member 24 has a plurality of intersecting spaced-apart second rods 243, and a plurality of positioning grooves 244 facing the studs 234 of the first frame member 23. The studs 234 are respectively aligned with the positioning grooves 244 and press the first mesh screens 26, the recycled vane sheets 25, and the second mesh screen 27 against the respective positioning grooves 244.

The recycled vane sheets 25 are stacked on each other and cover an entire area between the first and second frame members 23, 24. The recycled vane sheets 25 are made from, but not limited to, recycled cloths (such as woven or non-woven waste bags, waste flags, etc.), wastepaper, waste canvas, waste grapheme sheets, waste acrylic sheets, waste plastic or rubber sheets, etc. By reutilization of the aforesaid recycled waste materials, not only does the vane device of the present disclosure provide environmental protection, but it also has reduced cost of manufacture.

In order to avoid vibration of the recycled vane sheets 25, the recycled vane sheets 25 are sandwiched between the first and second mesh screens 26, 27. In practice, the first and second mesh screens 26, 27 may be provided with rough surfaces, such as protrusions and recesses, to frictionally contact and stabilize the recycled vane sheets 25.

The hinge member 28 has two pivotal hinge pieces 281 (see FIGS. 3 and 6)) connected between the first and second frame members 23, 24. When the frame 21 is propelled by wind, the flow guide plate 29 can stabilize rotation of the frame 21. In practice, the structural configuration of the frame 21 is not only limited thereto.

The mount seat 22 of each vane unit 2 extends along an axial direction of the shaft body 11 and abuts one of the mounting surfaces 112 of the shaft body 11. In this embodiment, the mount seat 22 of each van unit 2 has two axially opposite ends (22a), a mount seat inner surface 221, an engagement block 222 and a mount seat outer surface 223.

The mount seat inner surface 221 abuts one of the mounting surfaces 112. The engagement block 222 is formed on the mount seat inner surface 221 and engages the engagement recess 113 of the respective mounting surface 112. The mount seat outer surface 223 is opposite to the mount seat inner surface 221. Each opposite end (22a) of the mount seat 22 has two projection blocks 225 that project from the mount seat outer surface 223 in a direction away from the mount seat inner surface 221 and that are spaced apart and are respectively disposed at two opposite sides of the common radial plane (L). In addition, the mount seat 22 of each of the vane units 2 has two seat halves 220 symmetric to each other with respect to the common radial plane (L). One of the seat halves 220 is connected to one side of the first frame member 23 proximate to the shaft body 11. The other one of the seat halves 220 is connected to one side of the second frame member 24 proximate to the shaft body 11.

Each of the connection units 31 is disposed between the brackets 14 of one of the coupling modules 13. One of the opposite ends (22a) of the mount seat 22 of each of the vane units 2 is disposed between the brackets 14 of one the coupling modules 13 and between one of the connection units 31 and the periphery 111 of the shaft body 11. Each connection unit 31 detachably connects one of the opposite ends (22a) of the mount seat 22 of one of the vane units 2 to one of the coupling modules 13.

Each connection unit 31 has a rotary member 32 aligned with the insertion holes 141 of the brackets 14, and two pin members 33 threadedly inserted into the rotary member 32 and projecting outwardly from two opposite ends of the rotary member 32 to respectively extend into the insertion holes 141. In this embodiment, the first hole end 1410 of the insertion hole 141 is proximate to the rotary member 32. The second hole end 1411 of the insertion hole 141 is distal from the rotary member 32. Because the insertion holes 141 of the brackets 14 taper from the respective first hole ends 1410 to the respective second hole ends 1411, the insertion holes 141 gradually press the pin members 33 toward the periphery 111 of the shaft body 11 during the movements of the pin members 33 into the insertion holes 141.

The rotary member 32 of each connection unit 31 has an inner threaded surface 321, an outer surface 322 surrounding the inner threaded surface 321, and two screw threads 323 formed in the inner threaded surface 321. The outer surface 322 has a hexagonal cross-section and can be rotated by using a hand tool. The screw threads 323 are oriented in two opposite helical directions and at two symmetrical positions with respect to the common radial plane (L), and respectively and threadedly engage the pin members 33.

Each pin member 33 has a threaded portion 331 threadedly connected to one of the screw threads 323, and an insertion portion 332 extending outwardly from the threaded portion 331 along the alignment line (T). The insertion portion 332 has a first outer surface 333 facing in a direction toward the shaft body 11, and a second outer surface 334 facing oppositely of the first outer surface 333. The second outer surface 334 is inclined from the alignment line (T) and slanted toward the first outer surface 333 from a junction of the threaded portion 331 and the insertion portion 332 to a free end of the insertion portion 332. Particularly, the first outer surface 333 is a flat surface, and the second outer surface 334 is a longitudinally sectioned portion of a truncated conical surface.

Figure 4:
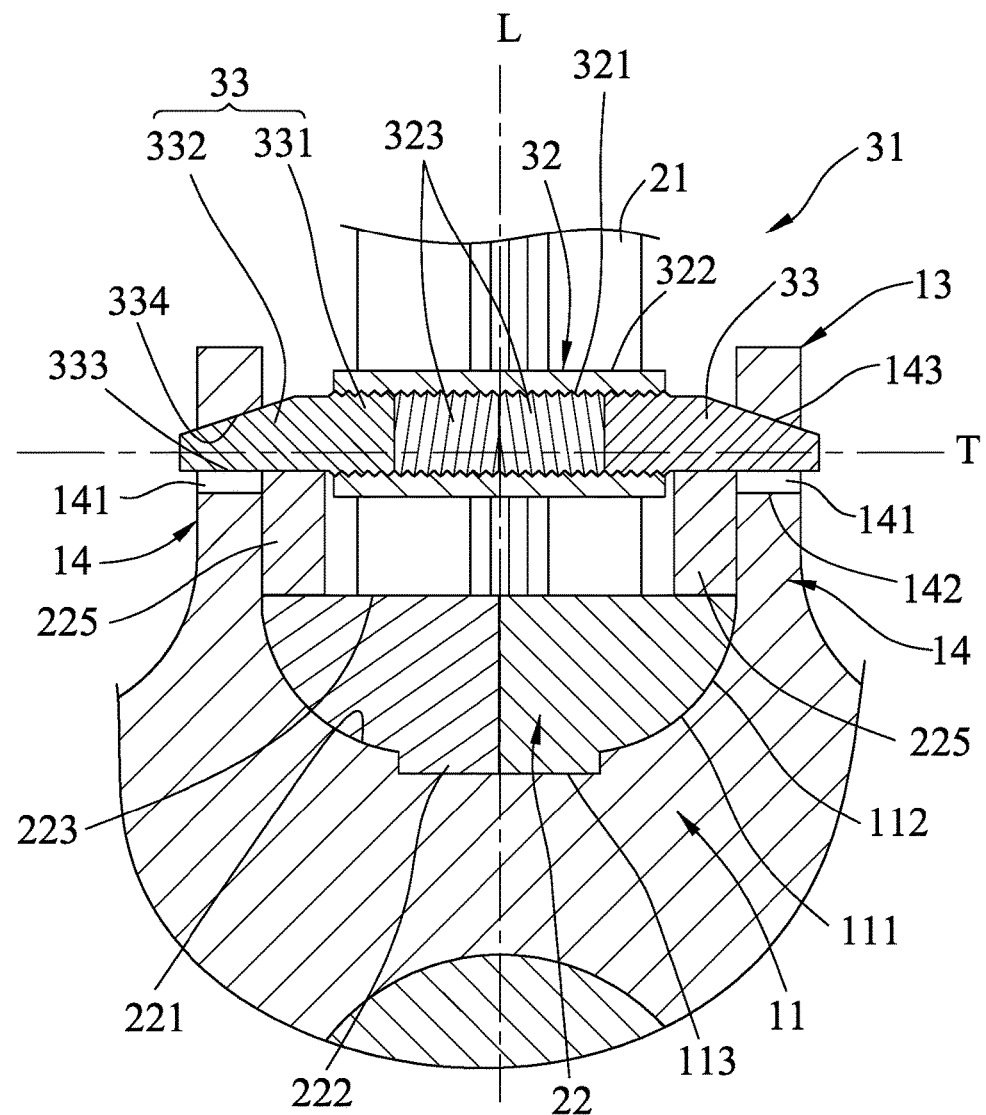
FIG. 4 is an enlarged fragmentary sectional view of the embodiment, illustrating one of the connection units detachably connecting one of the vane units to the rotation unit.

As shown in FIG. 4, the projection blocks 225 of the mount seat 22 project to the connection unit 31. The projection blocks 225 have free ends respectively abutting the first outer surfaces 333 of the pin members 33 of the connection unit 31.

In order for public use of the vane device of the disclosure, the recycled vane sheets 25 are designed to be easily obtained from the recycled materials. However, because the recycled materials are not durable, the recycled vane sheets 25 have to be replaced after a period of time. Therefore, each vane unit 2 is designed to be easily detached or re-attached to the shaft body 11 by a user for replacement of the recycled vane sheets 25.

As shown in FIGS. 4 and 5, when the rotary member 32 is rotated by a hand tool, the pin members 33 are moved toward each other so that the pin members 33 are released from the insertion holes 141. Accordingly, each connection unit 31 can be detached from the respective coupling module 13.

Figure 6:
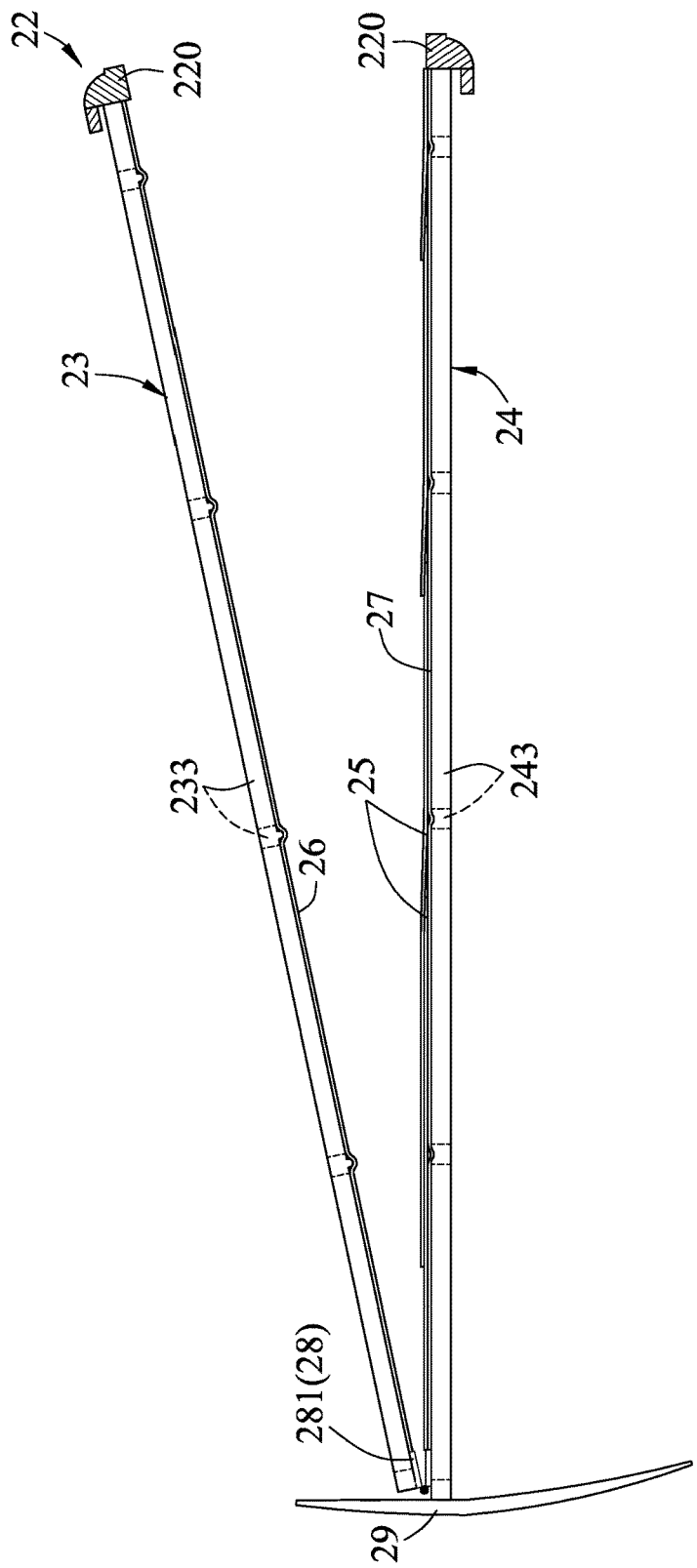
FIG. 6 is a sectional view of the embodiment, illustrating that each vane unit has a first frame member, and a second frame member movably connected to each other.

Referring to FIG. 6, when the vane unit 2 is detached from the shaft body 11, the first and second frame members 23, 24 can be separated to move away from each other for replacing the recycled vane sheets 25 therebetween. After replacement of the recycled vane sheets 25, the first and second frame members 23, 24 are put together to clamp the first mesh screen 26, the recycled vane sheets 25 and the second mesh screen 27 therebetween.

Referring back to FIG. 4, to connect the vane unit 2 to the coupling module 13, the mount inner surface 221 of the mount seat 22 abuts the mounting surface 112 of the shaft body 11, the engagement block 222 engages the engagement recess 113 of the mounting surface 112, and the connection unit 31 is disposed between the brackets 14. When the rotary member 32 is rotated, the pin members 33 are moved away from each other so that the pin members 33 are respectively inserted into the insertion holes 141. During rotation of the rotary member 32, because the second boundary surface 143 of each bracket 14 is slanted toward the first boundary surface 142 from the first hole end 1410 to the second hole end 1411 of the insertion hole 141, the second outer surfaces 334 of the respective pin members 33 are gradually pressed by the second boundary surfaces 143. The pin members 33 are therefore moved to press the mount seat 22 against the shaft body 11. By rotating the rotary member 32 of the connection unit 31, the mount seat 22 is pressed to abut the shaft body 11 by the connection unit 31. Therefore, the vane unit 2 is stably assembled to the rotation unit 1. In practice, each pin member 33 may be secured to the rotary member 32 by additionally inserting a locking pin.

In practice, only one of the second outer surface 334 of each pin member 33 and the second boundary surface 143 of each bracket 14 needs to be a slanted surface. In other words, as long as the insertion holes 141 can gradually press the pin members 33 toward the periphery 111 of the shaft body 11, when one of the second outer surface 334 of each pin member 33 and the second boundary surface 143 of each bracket 14 forms the longitudinally sectioned portion of the truncated conical surface, the other one of the second outer surface 334 and the second boundary surface 143 can be a flat surface.

Further, the number of the coupling modules 13, the vane units 2, or the connection units 31 is not limited to this disclosure. On the other end, while every two of the coupling modules 13 are respectively disposed at two opposite ends of one of the vane units 2 in this embodiment, they may be respectively disposed at any two axially spaced apart positions of the vane unit 2 other than the two opposite ends of the vane unit 2 according to other embodiments. Like the coupling modules 13, every pairs of the projection blocks 225, or every two of the connection units 31 may be respectively disposed at any two axially spaced apart suitable positions of the respective vane unit 2.

Figure 7:
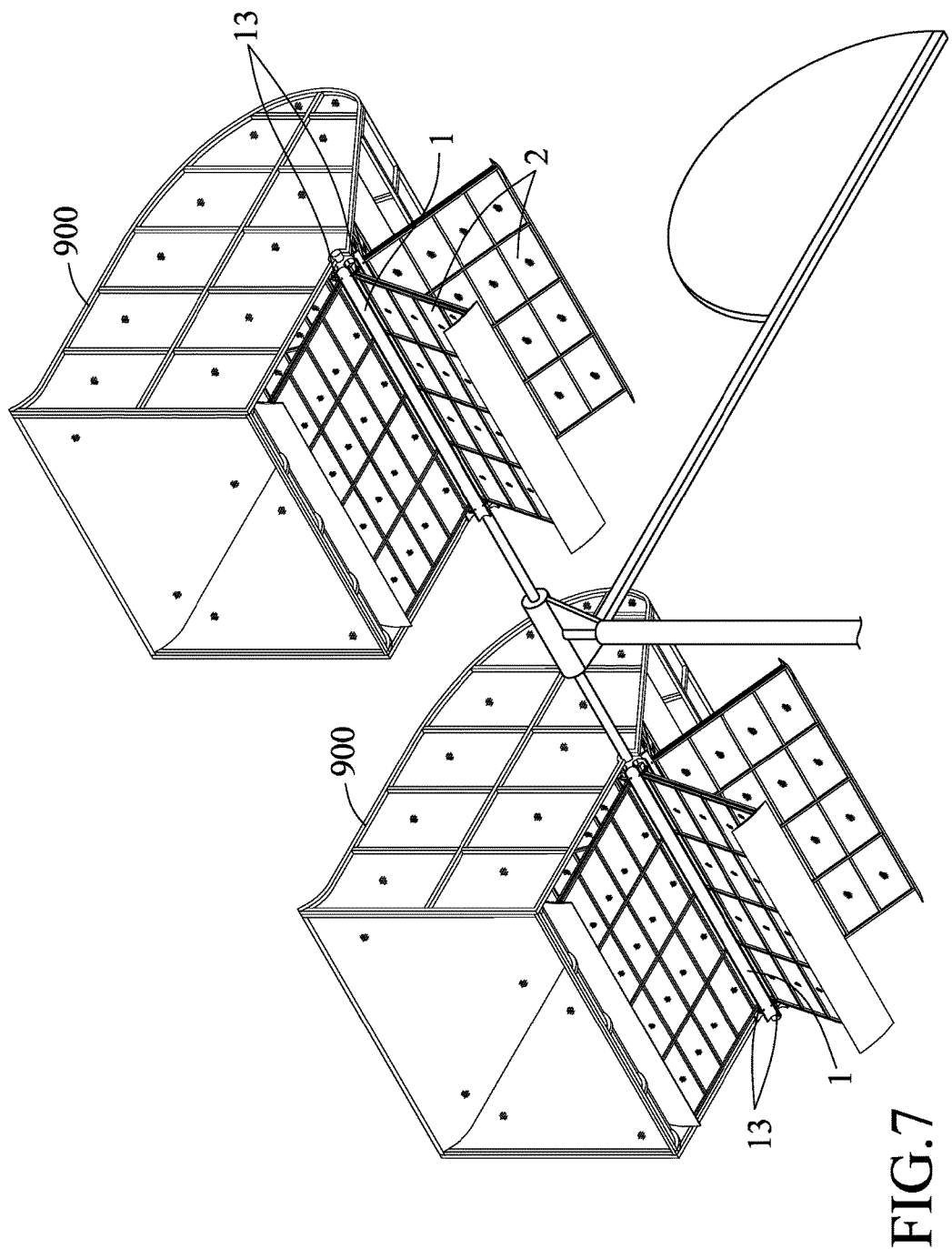
FIG. 7 illustrating a wind power generation system incorporating two vane devices of the present disclosure which are respectively assembled to two flow guide casings.
Figure 8:
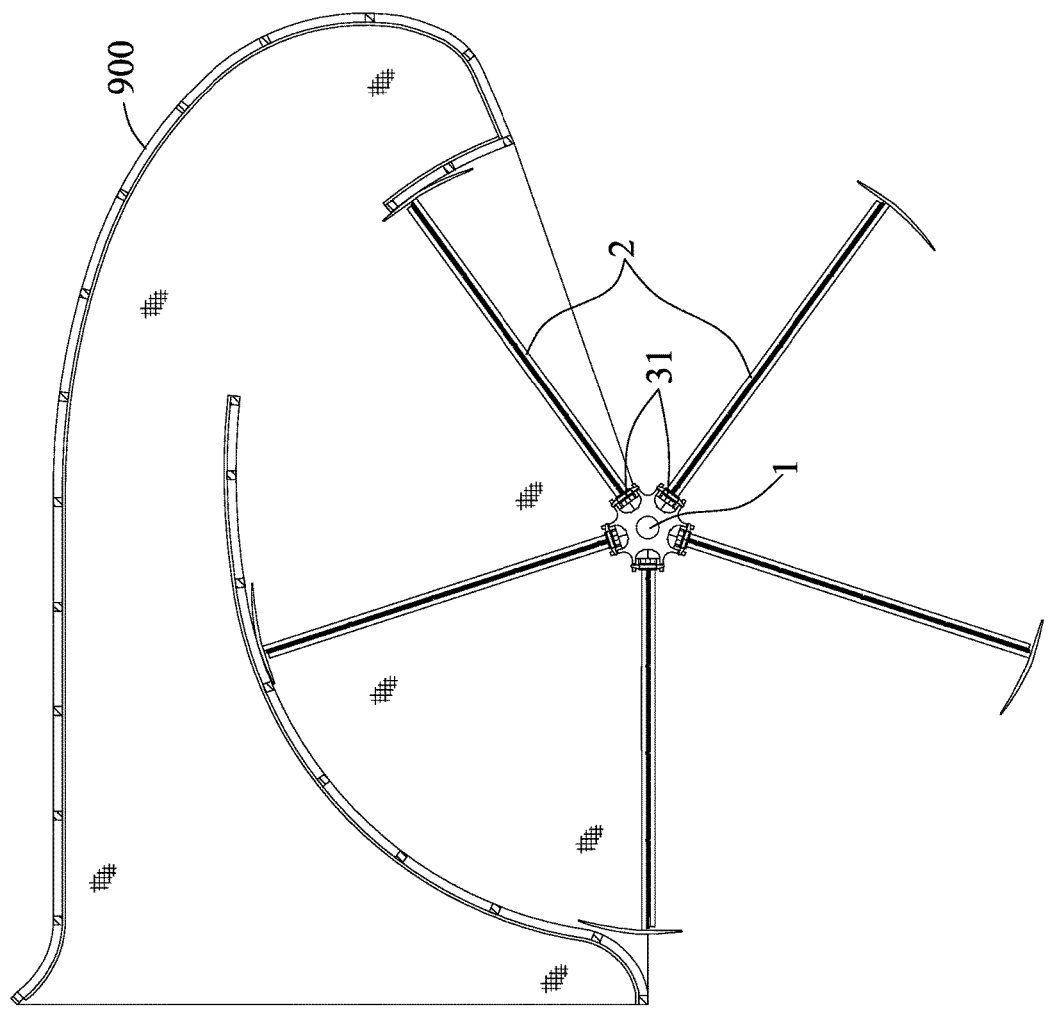
FIG. 8 is a fragmentary sectional view of the wind power generation system of FIG. 7, illustrating one of the vane devices assembled to one of the flow guide casings.

Referring to FIGS. 7 and 8, a wind power generation system is formed by assembling together two vane devices of the present disclosure. Each of the vane devices is combined with a flow guide casing 900. The wind power generation system generates electricity power when the vane devices of the present disclosure are driven by wind to operate.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A vane device adapted for generation of electricity, comprising:
    a rotation unit including a shaft body, and a plurality of angularly spaced-apart coupling modules disposed around said shaft body,
    a plurality of vane units mounted to said coupling modules and each of said plurality of vane units includes a frame and amount seat that is connected to said frame, said mount seat extending along an axial direction of said shaft body and having two axially opposite ends; and
    a plurality of connection units each detachably connecting one of said opposite ends of said mount seat of one of said vane units to one of said coupling modules;
    each of said coupling modules having two parallel brackets that are parallel to a common radial plane that extends axially and radially of said shaft body between said brackets, said brackets projecting from a periphery of said shaft body along the common radial plane, each of said brackets having an insertion hole that is aligned with said insertion hole of the other one of said brackets along an alignment line normal to the common radial plane;
    each of said connection units being disposed between said brackets of one of said coupling modules, one of said opposite ends of said mount seat of each of said vane units being disposed between said brackets of one of said coupling modules and between one of said connection units and said periphery of said shaft body;
    each of said connection units having a rotary member aligned with said insertion holes of said brackets, and two pin members threadedly inserted into said rotary member and projecting outwardly from two opposite ends of said rotary member to respectively extend into said insertion holes, said rotary member having two screw threads that are oriented oppositely and that respectively and threadedly engage said pin members;

wherein, when said rotary member is rotated, said pin members are moved toward each other so that said pin members are released from said insertion holes, or moved away from each other so that said pin members are respectively inserted into said insertion holes.

2. The vane device as claimed in claim 1, wherein said insertion hole of each of said brackets has a first hole end proximate to the common radial plane, and a second hole end opposite to said first hole end and distal from the common radial plane, said insertion holes tapering from respective said first hole ends to respective said second hole ends so that said insertion holes gradually press said pin members toward said periphery of said shaft body during the movements of said pin members into said insertion holes.

3. The vane device as claimed in claim 2, wherein each of said brackets further has a first boundary surface, and a second boundary surface facing said first boundary surface, said first and second boundary surfaces cooperatively bounding said insertion hole, each of said brackets having a free end distal from said periphery of said shaft body, said second boundary surface being more proximate to said free end than said first boundary surface, said second boundary surface being inclined from the alignment line and slanted toward said first boundary surface from said first hole end to said second hole end.

4. The vane device as claimed in claim 3, wherein each of said pin members has a threaded portion threadedly connected to one of said screw threads, and an insertion portion extending outwardly from said threaded portion along the alignment line, said insertion portion having a first outer surface facing in a direction toward said shaft body, and a second outer surface facing oppositely of said first outer surface, said second outer surface being inclined from the alignment line and slanted toward said first outer surface from a junction of said threaded portion and said insertion portion to a free end of said insertion portion.

5. The vane device as claimed in claim 1, wherein said periphery of said shaft body has a plurality of mounting surfaces formed between said brackets of one of said coupling modules to abut said mount seat of one of said vane units, each of said mounting surfaces being recessed to form an engaging recess, said mount seat of each of said vane units having a mount seat inner surface abutting one of said mounting surfaces, and an engagement block formed on said mount seat inner surface and engaging said engagement recess of said one of said mounting surfaces.

6. The vane device as claimed in claim 1, wherein said rotary member has an inner threaded surface and an outer surface surrounding said inner threaded surface, said outer surface having a hexagonal cross-section.

7. The vane device as claimed in claim 5, wherein said mount seat further has a mount seat outer surface opposite to said mount seat inner surface, each of said opposite ends of said mount seat having two projection blocks projecting from said mount seat outer surface to a corresponding one of said connection units, said projection blocks having free ends abutting said pin members of the corresponding one of said connection units.

8. The vane device as claimed in claim 1, wherein said frame of each vane units further has a first frame member, a second frame member, at least one recycled vane sheet clamped between said first and second frame members, at least one first mesh screen disposed between said at least one recycled vane sheet and said first frame member, and a second mesh screen disposed between said at least one recycled vane sheet and said second frame member.

9. The vane device as claimed in claim 8, wherein said first frame member has a plurality of intersecting spaced-apart first rods, and a plurality of studs projecting toward said second frame member from said first rods, said second frame member having a plurality of intersecting spaced-apart second rods, and a plurality of positioning grooves facing said first frame member, said studs being respectively aligned with said positioning grooves and pressing said at least one first mesh screen, said at least one recycled vane sheet, and said second mesh screen against respective said positioning grooves.

10. The vane device as claimed in claim 9, wherein said frame of each vane units further has a hinge member interconnecting said first and second frame members at one end of said frame distal from said shaft body.

11. The vane device as claimed in claim 10, wherein said mount seat of each of said vane units has two seat halves symmetric to each other with respect to the common radial plane, one of said seat halves being connected to one side of said first frame member proximate to said shaft body, the other one of said seat halves being connected to one side of said second frame member proximate to said shaft body.

\* \* \* \* \*